(12) United States Patent
Case et al.

(10) Patent No.: US 9,304,610 B2
(45) Date of Patent: Apr. 5, 2016

(54) EXPANDING PEN FOR INFORMATION HANDLING DEVICE

(71) Applicant: Lenovo (Singapore) Pte. Ltd., Singapore (SG)

(72) Inventors: Michaela Rose Case, Raleigh, NC (US); Christopher Miles Osborne, Cary, NC (US); Daniel Jordan Schantz, Raleigh, NC (US); Howard Locker, Cary, NC (US); Karen Ruth Kluttz, Raleigh, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 220 days.

(21) Appl. No.: 13/897,617

(22) Filed: May 20, 2013

(65) Prior Publication Data

US 2014/0340369 A1    Nov. 20, 2014

(51) Int. Cl.
*G06F 3/0354*    (2013.01)
*G06F 1/18*    (2006.01)

(52) U.S. Cl.
CPC ............ *G06F 3/03545* (2013.01); *G06F 1/182* (2013.01)

(58) Field of Classification Search
None
See application file for complete search history.

(56) References Cited

U.S. PATENT DOCUMENTS

| | | | | |
|---|---|---|---|---|
| 5,850,059 | A * | 12/1998 | Yoshimura | 178/19.01 |
| 6,146,038 | A * | 11/2000 | Mittersinker et al. | 401/6 |
| 6,703,570 | B1 * | 3/2004 | Russell et al. | 178/19.03 |
| 7,522,158 | B2 * | 4/2009 | Carlson et al. | 345/179 |
| 2004/0145579 | A1 * | 7/2004 | Lilenfeld | 345/179 |
| 2004/0233177 | A1 * | 11/2004 | Blacklock | 345/179 |
| 2006/0045604 | A1 * | 3/2006 | Fukui et al. | 401/6 |
| 2006/0083576 | A1 * | 4/2006 | Kanari | 401/54 |
| 2008/0158165 | A1 * | 7/2008 | Geaghan et al. | 345/173 |
| 2009/0136283 | A1 * | 5/2009 | Diamond | 401/99 |
| 2010/0084202 | A1 * | 4/2010 | Selin et al. | 178/19.01 |
| 2011/0268491 | A1 * | 11/2011 | Gregory et al. | 401/104 |
| 2012/0000717 | A1 * | 1/2012 | Hauck | 178/19.01 |
| 2014/0071100 | A1 * | 3/2014 | Becerra Figueroa | 345/179 |
| 2014/0253519 | A1 * | 9/2014 | David et al. | 345/179 |

* cited by examiner

*Primary Examiner* — Antonio Xavier
(74) *Attorney, Agent, or Firm* — Ference & Associates LLC

(57) ABSTRACT

An aspect provides an expandable pen, including: an internal portion; an external portion that is flexible; and a biased component that is flexible and positioned between the internal portion and the external portion; the biased component applying force to the external portion to flex it away from the internal portion. Other aspects are described and claimed.

16 Claims, 4 Drawing Sheets

EXPANDING PEN FOR INFORMATION HANDLING DEVICE

BACKGROUND

Information handling devices ("devices") come in a variety of forms, for example laptop computing devices, tablet computing devices, smart phones, e-readers, MP3 players, and the like. Many such devices are configured for use with a pen or stylus (hereinafter simply "pen") as a mode of input.

Certain form factors, e.g., tablets, are very thin and are getting thinner. For example, it is common for tablets to have a thickness or width dimension on the order of approximately 7 mm or less. Nonetheless, users of these devices continue to desire the support of pen interfaces.

BRIEF SUMMARY

In summary, one aspect provides an expandable pen, comprising: an internal portion; an external portion that is flexible; and a biased component that is flexible and positioned between the internal portion and the external portion; the biased component applying force to the external portion to flex it away from the internal portion.

Another aspect provides a system, comprising: an information handling device, comprising: a housing including: a pen input surface operatively coupled to one or more processors that process pen input; said housing further comprising a cavity therein for housing a pen; and an expandable pen, comprising: an internal portion; an external portion that is flexible; and a biased component that is flexible and positioned between the internal portion and the external portion; the biased component applying force to the external portion to flex it away from the internal portion.

A further aspect provides an expandable pen, comprising: a internal portion terminating in a tip; a circumferential external portion that is flexible an disposed proximate to the tip; and a plurality of biased components that are flexible and positioned between the internal portion and the circumferential external portion; the plurality of biased components applying force to the circumferential external portion to flex it away from the internal portion.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The illustrated example embodiments will be best understood by reference to the figures. The following description is intended only by way of example, and simply illustrates certain example embodiments.

Figure 1:
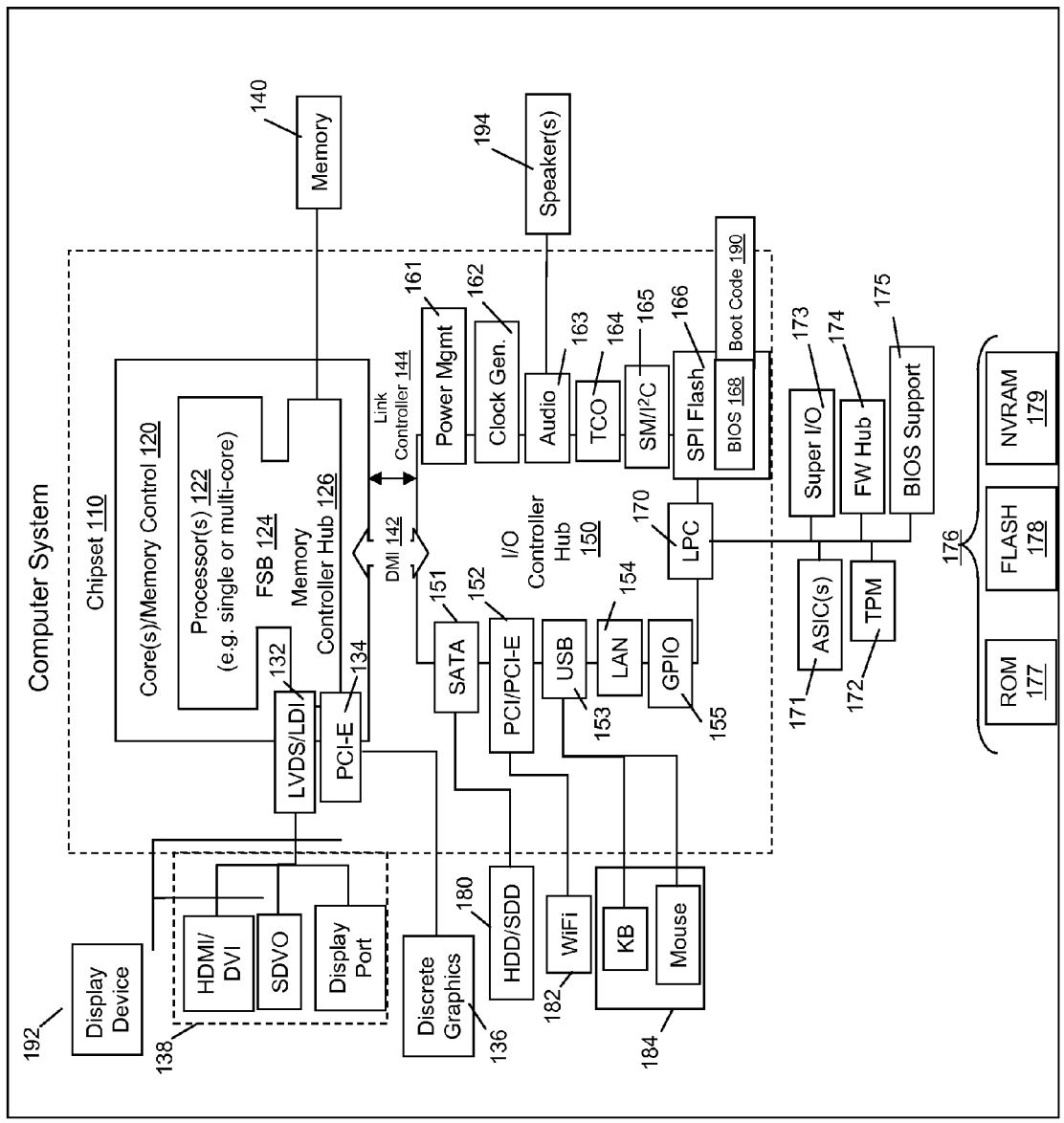
FIG. 1 illustrates an example of information handling device circuitry.
Figure 2:
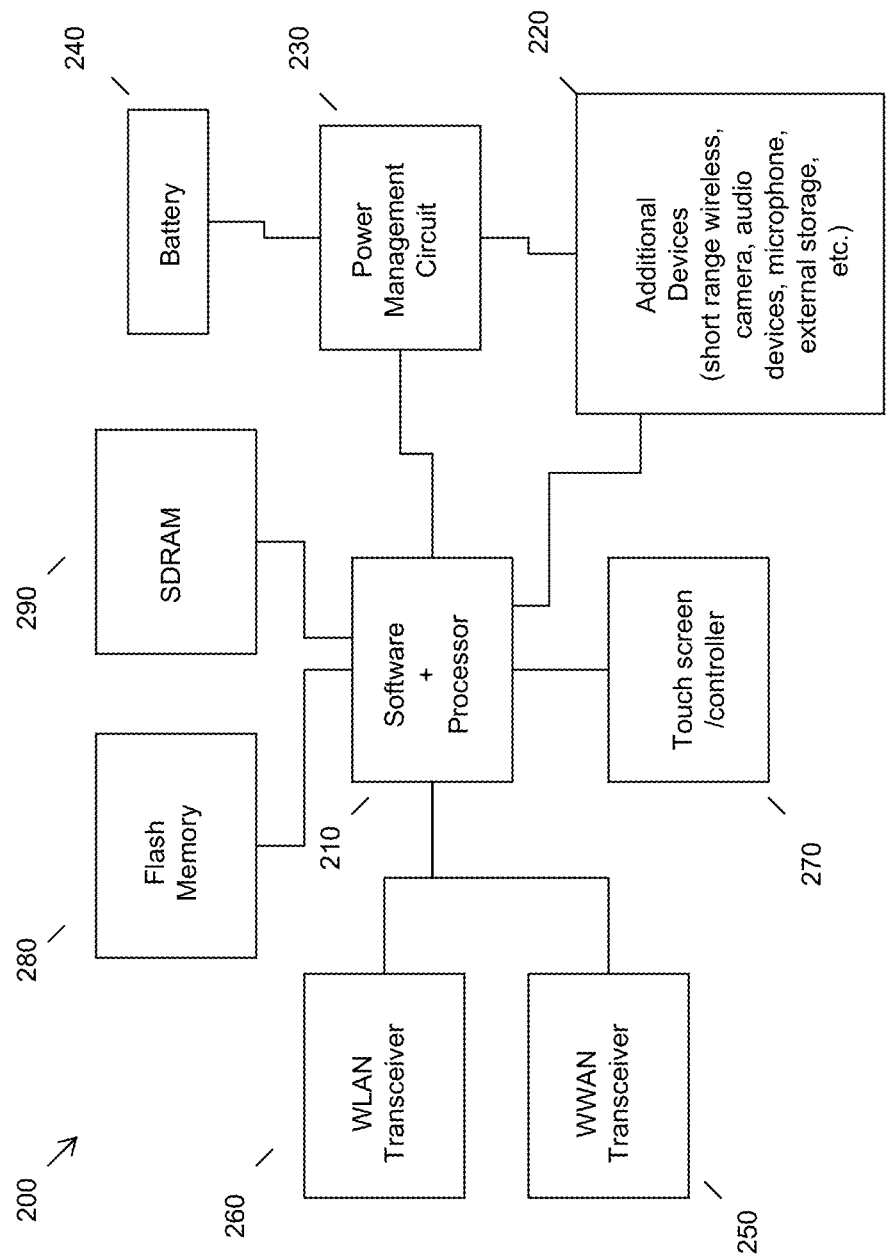
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1, for its part, depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may provide user interfaces that accept pen input (e.g., via a digitizer or touch screen input device). It should be noted that pens may be passive or active, as further described herein. Many users have become accustomed to using pen inputs. However, as described herein, the devices continue to get thinner, i.e., have reduced thickness or width dimensions, with some devices being on the order of 7 mm thick or less. It is very likely that many existing devices will become even thinner in the near future. Moreover, devices accepting pen input may include user-wearable devices, which may also have a thin profile, e.g., not sufficient for accommodating pen docks for larger diameter pens.

In order to accommodate what most users are accustomed to in terms of ergonomics, a sufficiently thick or sizable pen is required, e.g., a pen diameter that allows for ease of handling, comfort, etc. To dock a pen in a 7 mm tablet without increasing the tablet thickness requires the pen to be approximately 5 mm diameter or less. This is not desirable from a pen user experience point of view, as the pen is too thin and it is difficult for user to hold and use it. A customary pen diameter is approximately 7.5 mm to 8.5 mm. To dock (internally) this diameter pen would require a tablet at least 10 mm thick, which as above, is much thicker than the desired 7 mm or less. Simply providing a bump on the edge of the device that is thick enough to dock a thicker pen is undesirable from both an aesthetic and functional standpoint as it disrupts the overall appearance and feel of the device as well as introducing asymmetry into the device layout that may negatively impact performance (e.g., ability to lie flat on a surface).

Accordingly an embodiment provides a thin device (e.g., 7 mm or less in the width dimension) that also supports a desirable pen diameter (e.g., approximately 7.5 mm to 8.5 mm) with the ability to dock the pen with the device (e.g., tablet) without increasing the device thickness.

Figure 3:
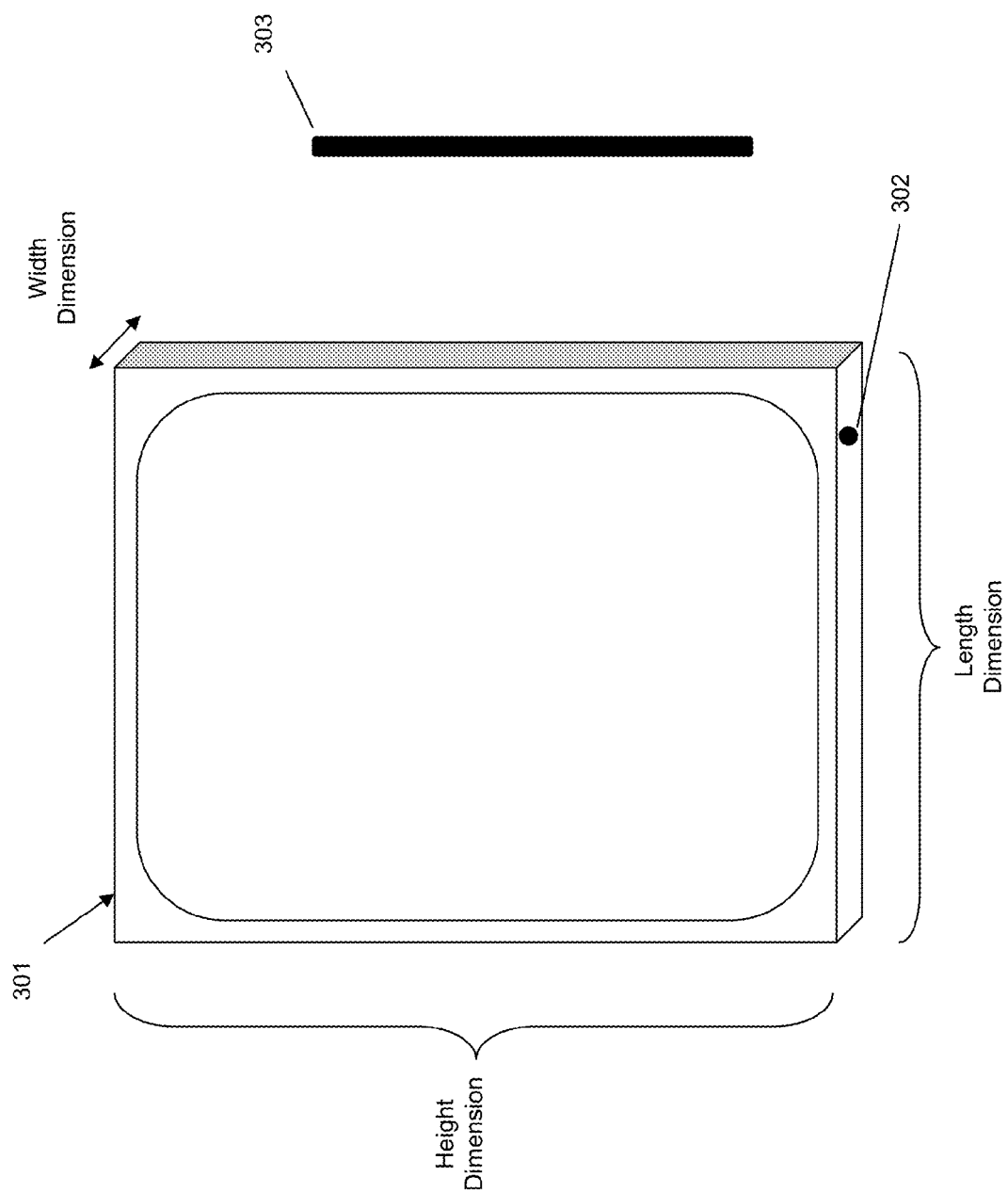
FIG. 3 illustrates an example information handling device and housing thereof

Illustrated in FIG. 3 is a perspective representation of an example tablet device 301. In FIG. 3 it can be appreciated that the length dimension (e.g., across the bottom of the device 301) and the height dimension (e.g., along the side of the device 301) are substantially greater than or exceed the width dimension of the device (e.g., the thickness of the device 301). The width dimension defines how thick or thin the device 301 is and as described herein the devices are trending toward thinner profiles (i.e., reduced width dimension). As described herein, conventional docking mechanisms for pens, e.g., providing a circular or pen shaped slot or cavity 302 within the device for inserting the pen 303 into the cavity 302 of the device is not viable while maintaining the current trend towards reduced width dimensions, unless reduced pen 303 diameters are accepted.

Figure 4:
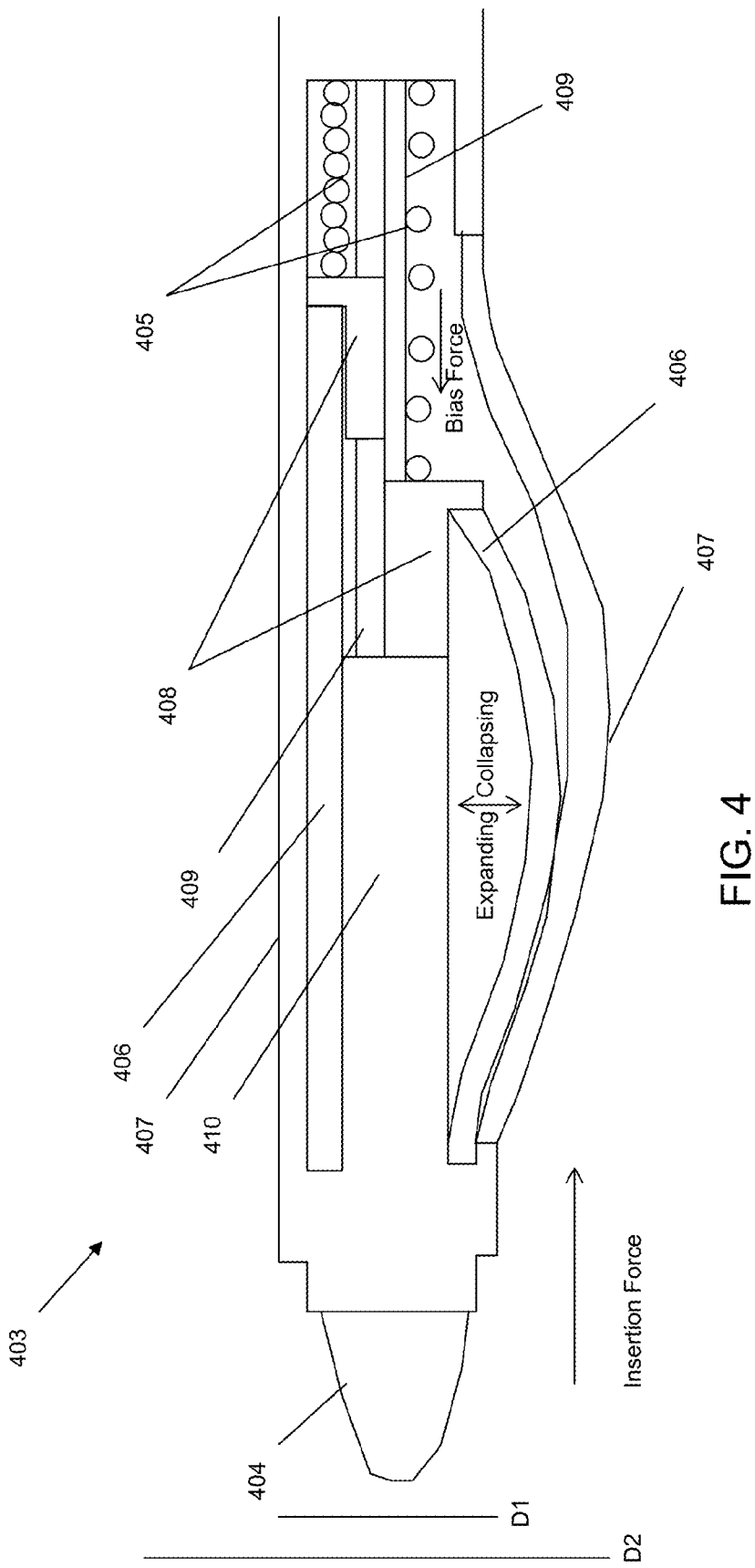
FIG. 4. illustrates an example expandable pen.

FIG. 4 illustrates a cross sectional view of an example expandable pen 403. Here it can be appreciated that an embodiment provides an expandable pen 403 that, in a collapsed condition, has a first diameter (D1) and in an expanded condition has a second diameter (D2). The collapsed condition is obtained by inserting the expandable pen 403 into a cavity (e.g., 302) of a device and thus providing collapsing or insertion force to the exterior of the expandable pen 403. The expanded condition or resting condition is obtained by withdrawing the expandable pen 403 from the cavity (e.g., 302) and thus relieving the collapsing or insertion force from the exterior of the expandable pen 403.

An embodiment may utilize a mechanism, e.g., a spring mechanism including one or more springs 405, to provide an adaptable diameter expandable pen 403. The diameter may vary from, in a collapsed position, about 5 mm or less to, in an expanded condition, about 8 mm or more. In an embodiment, a biased component 406, e.g., formed of a resilient material such as spring steel, is housed within the expandable pen 403 such that it imparts force against an exterior portion 407, e.g. formed of a flexible material such as rubber or other like material, whereby a smooth, ergonomic shaft having an increased diameter (e.g., D2) is formed in a resting condition.

In an embodiment, the size change occurs automatically upon insertion/removal of the expandable pen 403 from a cavity (e.g., 302) in an information handling device such as a tablet or smart phone. When removing the expandable pen 403 from the cavity, a lack of insertion force or other compression force (e.g., imparted by walls of the cavity) allows a spring 405 to force internal components (e.g., shuttle(s) 408 on track(s) 409) into a position that imparts an outward/projection/expansion force to biased component(s) 406 away from a central (also referred to herein as an internal) portion 410, which in turn forces the exterior portion 407 outward to achieve the second diameter D2. On insertion, the walls of the cavity force (via insertion force) the exterior portion 407 inward, which in turn applies a force to biased component(s) 406, which in turn move internal mechanisms (e.g., shuttle(s) 408/spring(s) 405) to transition distal (away from the tip 404) and therefor allow the expandable pen 403 to collapse to the first diameter D1.

As will be readily understood, the mechanism described above may be modified as desired. For example, instead of a passive expanding/collapsing under insertion force, a trigger (e.g., button press) may be utilized to trigger the expandable pen's 403 shape change (i.e., expanding/collapsing) and thus the diameter change. The trigger may be a purely mechanical trigger, e.g., a button press translated into a corresponding collapsing/expanding force and moving of a spring mechanism, or may be used to activate an electronic movement within the expandable pen, e.g., as powered by one or more batteries, which in turn operates on a biased component to impart expanding/collapsing between the diameters.

Moreover, the example illustrated in FIG. 4 may include two or more (i.e., a plurality of) biased components 406. In one example embodiment, a plurality of biased components 405 are included such that, on withdrawal from a cavity (or activation of a trigger, as described herein), the plurality of biased components 405 are transitioned outward at discrete points, e.g., similar to an umbrella, such that an overlying single exterior component 407, e.g., formed of rubber or other pliable synthetic material, forms a smooth, ergonomic (i.e., circumferential) exterior having an increased diameter. Thus, the expandable pen 403 achieves a larger, more user friendly diameter while withdrawn from a cavity (or otherwise triggered to expand) but at the same time permits the expandable pen 403 to be collapsed and inserted into the (smaller) cavity for retention within the thinner profile information handling devices.

It is worth noting that the expandable pen 403 is to be used with a pen input surface of an information handling device, e.g., a digitizer of a computing device or a touch screen of a tablet computer or smart phone. Therefore, the expandable pen 403 may simply be passively involved with pen input, e.g., not transmitting any electronic/electromagnetic signal, such as for use with a capacitive pen input surface. Alternatively or additionally, the expandable pen 403 may be an active pen, e.g., including electronic components. The electronic components of the expandable pen 403, if included, may take a variety of forms. For example, the electronic components may be passive coils that receive energy from the pen input surface and thereafter transmit energy back to the pen input surface. Alternatively, the electronic components of the expandable pen 403 may be active, i.e., use internal power (e.g., as supplied by one or more batteries) to actively transmit energy detectable by the pen input surface of the information handling device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "element" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. Aspects are described herein with reference to the figures, which illustrate examples. It will be understood some actions and functionality may be implemented at least in part by program instructions. These program instructions may be provided to a processor, such that the instructions, which execute via a processor of the device, implement functions/acts.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An expandable pen, comprising:
   an internal portion;
   a circumferential external portion that is flexible;
   a plurality of biased components that are flexible and positioned between the internal portion and the external portion;
   each said biased component being associated with a shuttle, wherein each shuttle repositions responsive to a force applied to a biased component; and
   a spring that applies a biasing force to each of the plurality of biased components via each shuttle;
   the plurality of biased components forcing the external portion to flex away from the internal portion.

2. The expandable pen of claim 1, wherein, the plurality of biased components and the external portion collapse responsive to an insertion force.

3. The expandable pen of claim 1, wherein each shuttle is forced, by the spring, proximate to a tip of the expandable pen in rest position.

4. The expandable pen of claim 1, wherein each shuttle is forced, by application of the insertion force, distal to the tip of the expandable pen in a collapsed position.

5. The expandable pen of claim 4, wherein the collapsed position corresponds to an insertion condition wherein said expandable pen is inserted into a housing of an information handling device.

6. The expandable pen of claim 1, further comprising one or more electronic components.

7. The expandable pen of claim 6, wherein the one or more electronic components include passive components for interfacing with a pen input surface of an information handling device.

8. The expandable pen of claim 6, further comprising one or more batteries, wherein:
   the one or more electronic components comprise active electronic components for interfacing with the pen input surface of the information handling device; and
   wherein the one or more batteries supply power to the active electronic components.

9. A system, comprising:
   an information handling device, comprising:
      a housing including:
         a pen input surface operatively coupled to one or more processors that process pen input;
         said housing further comprising a cavity therein for housing a pen; and
   an expandable pen, comprising:

an internal portion;

a circumferential external portion that is flexible; and a plurality of biased components that are flexible and positioned between the internal portion and the external portion;

each said biased component being associated with a shuttle, wherein each shuttle repositions responsive to a force applied to a biased component;

a spring that applies a biasing force to each of the plurality of biased components via each shuttle;

the plurality of biased components forcing the external portion to flex away from the internal portion.

10. The system of claim 9, wherein, the plurality of biased components and the external portion collapse responsive to an insertion force.

11. The system of claim 9, wherein:

each shuttle is forced, by the spring, proximate to a tip of the expandable pen in rest position; and each shuttle is forced, by application of the insertion force, distal to the tip of the expandable pen in a collapsed position.

12. The system of claim 9, wherein the expandable pen further comprises one or more electronic components disposed within said expandable pen.

13. The system of claim 12, wherein the one or more electronic components include passive components for interfacing with the pen input surface.

14. The system of claim 12, wherein the expandable pen further comprises one or more batteries, wherein:

the one or more electronic components comprise active electronic components for interfacing with the pen input surface; and wherein the one or more batteries supply power to the active electronic components.

15. An expandable pen, comprising:

a internal portion terminating in a tip;

a circumferential external portion that is flexible and disposed proximate to the tip; and a plurality of biased components that are flexible and positioned between the internal portion and the circumferential external portion;

each said biased component being associated with a shuttle, wherein said shuttle repositions responsive to a force applied to a biased component;

a spring that applies a biasing force to each of the plurality of biased components via each shuttle;

the plurality of biased components forcing the circumferential external portion to flex away from the internal portion.

16. The expandable pen of claim 15, wherein the plurality of biased components and the circumferential external portion collapse responsive to an external force.

* * * * *